(No Model.) 7 Sheets—Sheet 1.

F. H. TREAT.
ROLLING MILL.

No. 314,083. Patented Mar. 17, 1885.

Witnesses: Inventor.

(No Model.) 7 Sheets—Sheet 4.

F. H. TREAT.
ROLLING MILL.

No. 314,083. Patented Mar. 17, 1885.

Witnesses:

Inventor:

(No Model.) 7 Sheets—Sheet 5.

F. H. TREAT.
ROLLING MILL.

No. 314,083. Patented Mar. 17, 1885.

Witnesses:
E. P. Naylor
H. A. Jones

Inventor.
Francis H. Treat
by his attorney

(No Model.) 7 Sheets—Sheet 6.
F. H. TREAT.
ROLLING MILL.

No. 314,083. Patented Mar. 17, 1885.

Witnesses:
E. P. Walker
W. A. Jones

Inventor:
Francis H. Treat
by his attorney

UNITED STATES PATENT OFFICE.

FRANCIS H. TREAT, OF JOLIET, ILLINOIS, ASSIGNOR OF TWO-THIRDS TO HORACE S. SMITH AND CHARLES PETTIGREW, BOTH OF SAME PLACE.

ROLLING-MILL.

SPECIFICATION forming part of Letters Patent No. 314,083, dated March 17, 1885.

Application filed September 19, 1883. (No model.)

*To all whom it may concern:*

Be it known that I, FRANCIS H. TREAT, a citizen of the United States, residing at Joliet, in the county of Will and State of Illinois, have invented certain new and useful Improvements in Rolling-Mills; and I do hereby declare the following to be a full, clear, and exact description of the invention, such as will enable others skilled in the art to which it appertains to make and use the same.

This invention is designed more especially to facilitate the rolling, by three-high rolls, of railroad-rails in long pieces to be subsequently cut up into rails of required lengths; but it may be applied to three-high rolls for rolling metal beams, channel-bars, and the like.

The object of my invention is to carry on the whole of the series of operations for converting the bloom into a rail by power mechanism.

To this end it consists of certain combinations of mechanical devices, which combinations are stated in the claims at the close of this specification.

In order that my invention may be clearly understood, I have illustrated in the annexed drawings and will proceed to describe the best form thereof at present known to me as applied to three-high rolls for rolling railroad-rails.

Figs. 3, 4, 7, 8, 9, and 10 are drawn on the same scale; Figs. 5, 6, 14, 15, and 16 on a scale twice as large; Figs. 11, 12, and 13 on a scale three times as large, and Figs. 1 and 2 on a scale nearly five times as large.

The same letters of reference indicate identical parts in all the figures.

Figure 1:
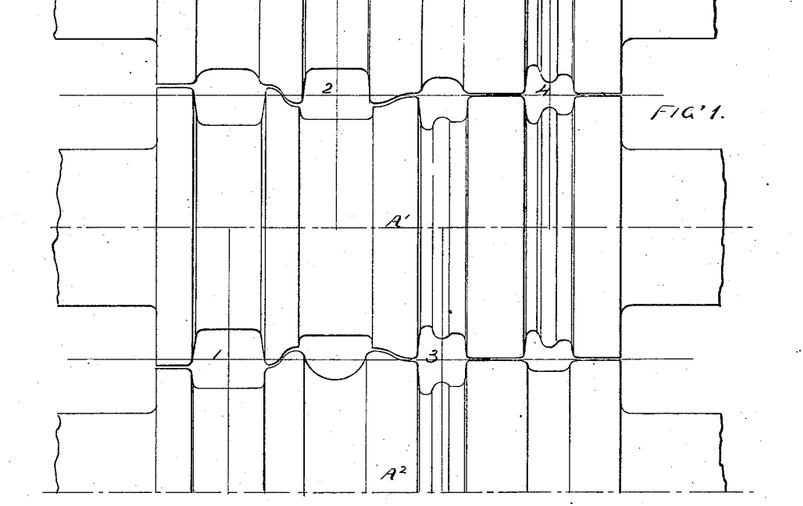
Figure 1 is a front elevation of the roughing-rolls, only one-half of the upper and lower rolls being shown.
Figure 2:
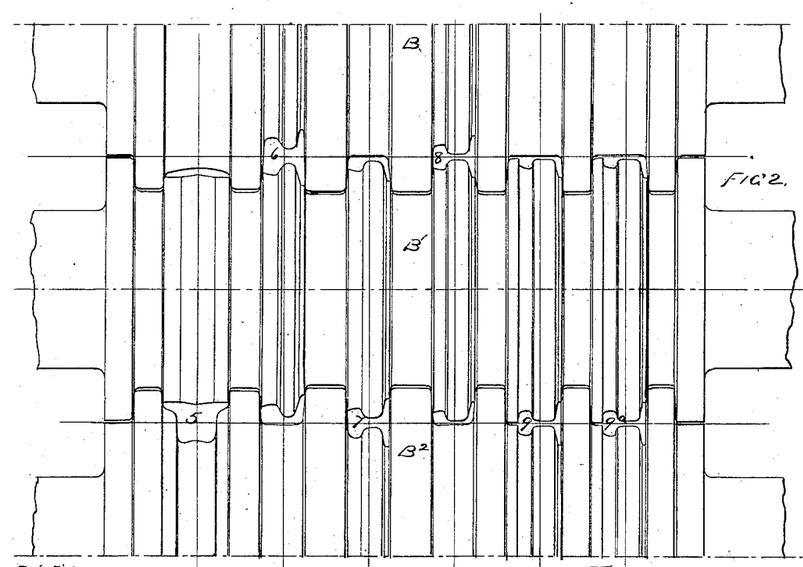
Fig. 2 is a similar view of the finishing-rolls.
Figure 3:
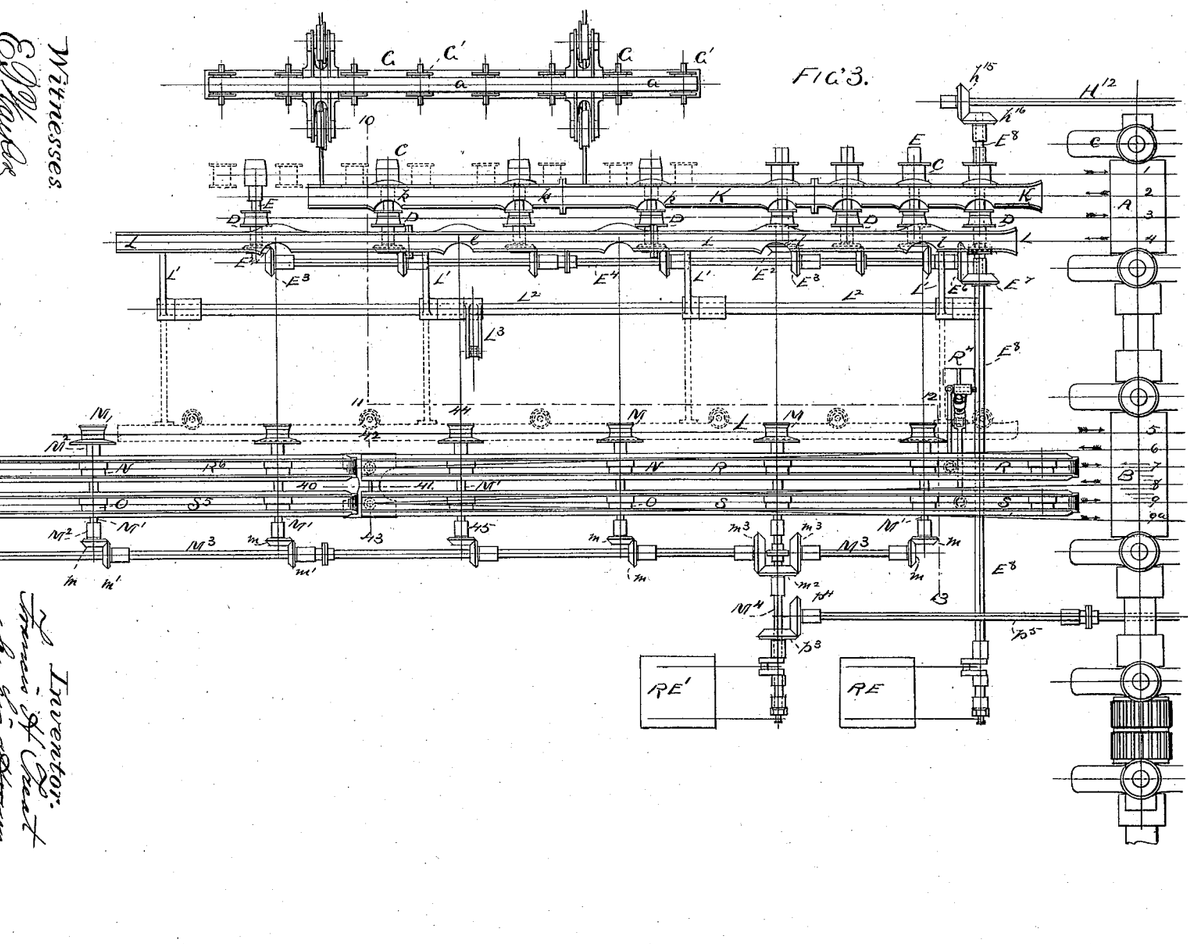
Fig. 3 is a plan view of the rolls and my power mechanism in front thereof.
Figure 4:
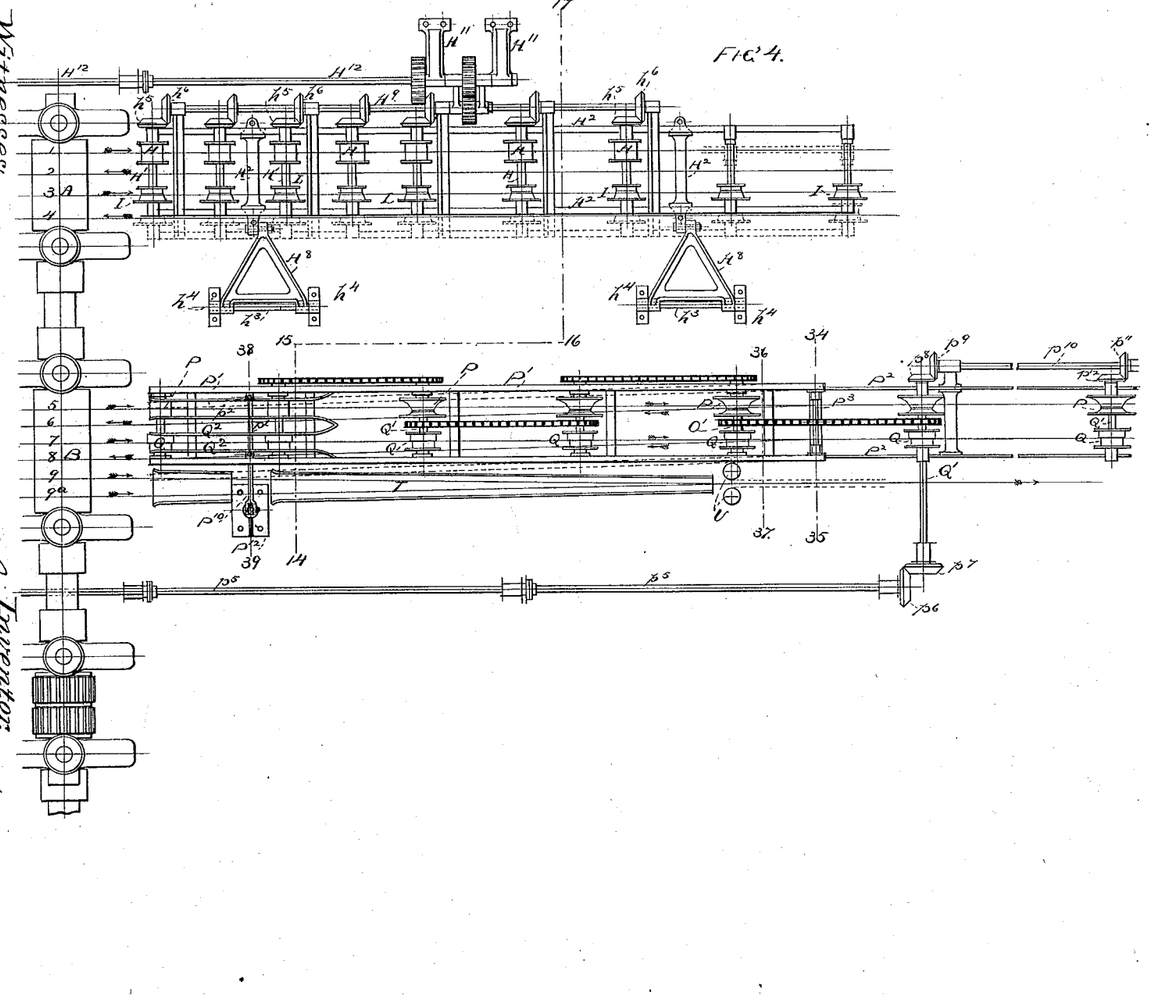
Fig. 4 is a plan view of the rolls and my power mechanism in rear thereof.

A A' A² refer to the roughing-rolls, and B B' B² to the finishing-rolls. The roughing-rolls are constructed to form the passes 1, 2, 3, and 4, and the finishing-rolls are constructed to form the passes 5, 6, 7, 8, 9, and $9^a$, passes 9 and $9^a$ being precisely alike, so that either may be used as the finishing-pass. The rolls do not differ from those now in common use for rolling steel railroad-rails, except that the whole number of passes in the two sets of rolls has been diminished by two, that all the passes of the roughing set are equally spaced, and that all the passes of the finishing set are also equally spaced. This equal spacing of the passes of the respective sets of rolls provides for the use of the simplest form of mechanism for transferring the billet or piece from pass to pass. In Figs. 3 and 4 the upper rolls, A and B, are shown as plain cylinders, but the center lines of the passes are indicated by light lines marked the same as the passes in Figs. 1 and 2. The rolls may be mounted and driven in the usual manner.

In front of the roughing-rolls are two lines of feed-rollers, (marked C and D, respectively,) the feed-rollers C being arranged in line with pass 1, and the feed-rollers D in line with pass 3, and at an elevation proper for the introduction of the piece into the guides (not shown) for said passes of the roughing-rolls. These feed-rollers C and D are mounted in pairs, as shown, on cross-shafts E, journaled in fixed bearings E' E', which are supported at one end on the side wall of the longitudinal pit F, and at the other end on a longitudinal beam, F', which rests on the end walls of said pit and on intermediate girders, F². (See Fig. 5.) Each feed-roller shaft E carries a fast bevel-wheel, E², meshing with a bevel-wheel, E³. The bevel-wheels E³ are fixed on a longitudinal shaft, E⁴, journaled in fixed bearings E⁵, which are set on the bases of the bearings E'. The end of the shaft E⁴ adjacent to the roughing-rolls carries a fast bevel-wheel, E⁶, which meshes with a bevel-wheel, E⁷, on the crank-shaft E⁸ of a reversing-engine, R E. Thus the two lines of feed-rollers C and D are driven simultaneously, and may be rotated in either direction, though these particular feed-rollers really require to be rotated in one direction only.

The bloom $a$ (see Fig. 3) is delivered sidewise to the line of feed-rollers C by means of a carriage, G, preferably provided with a line of flanged rollers, G', for the support of the bloom. This lateral delivery-carriage is mounted on trucks running on a cross-track, the rails of which rest at one end on beam F' over the pit F. All the feed-rollers C opposite to the delivery-carriage are flangeless. At least their ends facing said carriage should be flangeless and constructed taperingly, as clearly shown in Figs. 3 and 5. The rollers G' of the delivery-carriage support the bloom at such an elevation that on moving the carriage up to the line of feed-rollers C the bloom will ride up on the tapering ends of the latter, so that on reaching its proper position on the cylindrical portion of the said feed-rollers the bloom will no longer rest on the rollers G' of the delivery-carriage, although it still remains confined between the flanges thereof, so that it will be held in proper alignment as it is fed forward by the feed-rollers. Those feed-rollers which are located between the point where the forward end of the bloom is delivered and the roughing-rolls are constructed with flanges for the guidance of the bloom, as shown.

The feeding-surface of all the feed-rollers C is cylindrical, so as to provide a horizontal support for the lower side of the rectangular bloom. The feed-rollers C feed the bloom into pass 1 of the roughing-rolls, from the rear side of which it emerges as piece $b$, (see Fig. 6,) being received upon a line of cylindrical flanged feed-rollers, H, which act at the time as feeding-out rollers, but subsequently as feeding-in rollers, to feed piece $b$ into pass 2, as will be presently explained.

The feed-rollers H are fixed on cross-shafts H', mounted in suitable fixed bearings on a long rectangular frame, H². On the same cross-shafts H' are secured flanged feed-rollers I. The distance from center to center between the line of feed-rollers H and the line of feed-rollers I is equal to the distance from center to center between passes 1 and 3, or, what is the same, passes 2 and 4. The feed-rollers H and I and frame H² constitute a table, which I term the "rear roughing-table," and which is supported over a pit, H¹³, by the plunger of a single-acting hydraulic cylinder, H⁷, through the intervention of the connecting-rod H⁶, the arms H⁴ on the longitudinal rock-shaft H⁵, and the pairs of diverging struts H³ H³. The struts H³ are united at their lower ends and pivoted to the rocker-arms H⁴, one of which is pivoted to the connecting-rod of the hydraulic cylinder. The upper ends of the struts are screw-threaded, and frame H², through eyes on which these screw-threaded ends pass, is secured thereto by nuts $h'h^2$, which provide for the proper primary adjustment of the frame, as well as for the compensating for subsequent lost motion occasioned by wear in the movable joints. At one side frame H² is connected to a couple of radius-links, H⁸, preferably of triangular form shown, and secured each to a shaft, $h^3$, journaled in suitable bearings, $h^4$, set by the side of pit H¹³.

Figure 6:
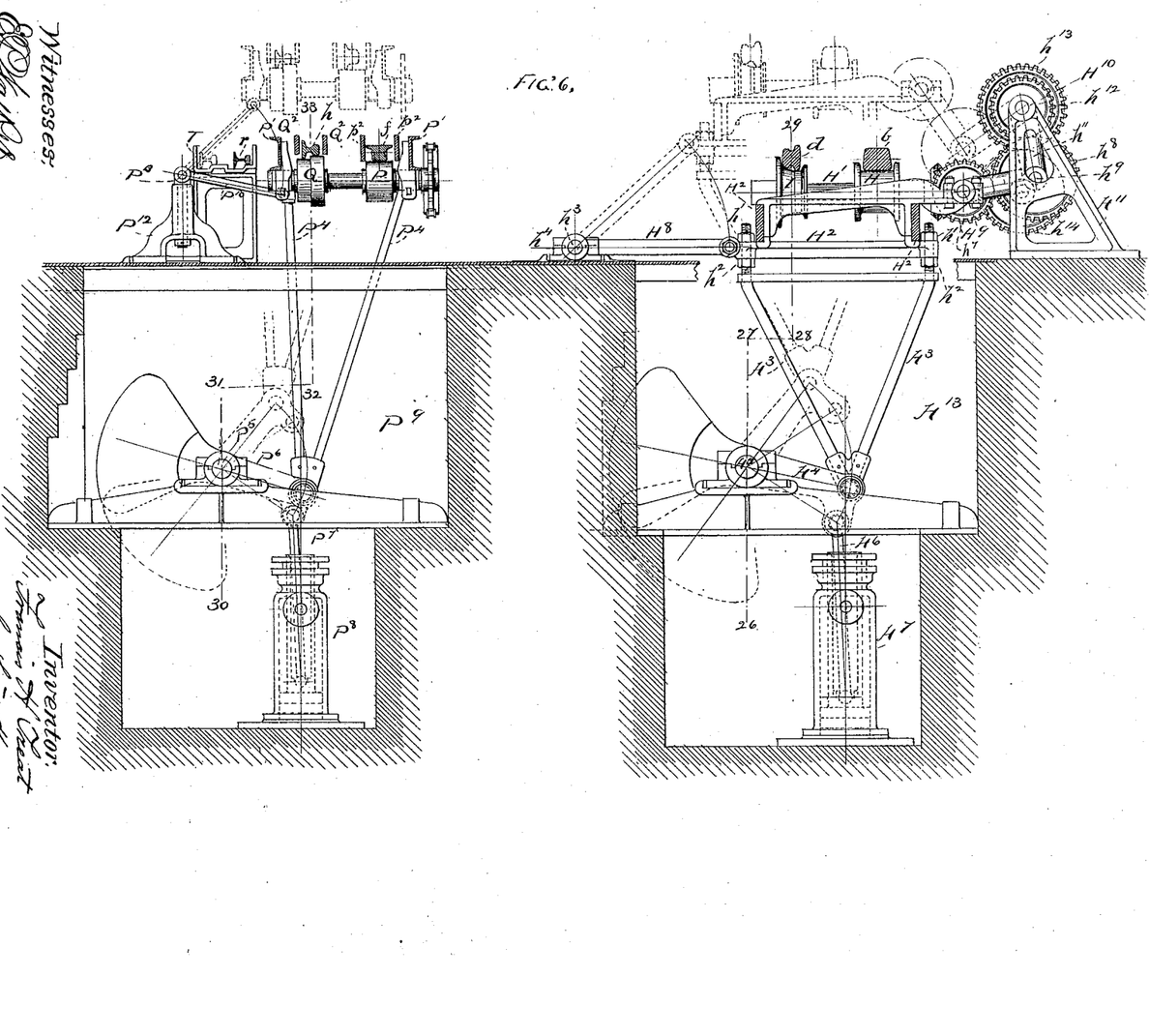
Fig. 6 is a transverse section, in planes indicated by lines 14 15 16 17 on Fig. 4, of my power mechanism in rear of the rolls.

The rear roughing-table, constructed and mounted as described, may be lifted by the plunger of the hydraulic cylinder H⁷ from the position it is shown in by full lines in Fig. 6 to the position it is shown in by dotted lines, and will descend by its own weight from its upper to its lower position when the hydraulic pressure is removed from the plunger of hydraulic cylinder H⁷. The radius-links cause a lateral movement of the table simultaneously with the up or down movement imparted to it by the hydraulic cylinder. The lateral movement of the table, as it is shifted from one position to the other, is exactly equal to the distance from the center of one pass of the roughing-rolls to the center of the next pass thereof, and the ascending or descending movement of the table is such that it will carry the piece from the level of the passes formed by the middle and lower roughing-rolls to the passes formed by the middle and upper roughing-rolls, and vice versa. This obliquely ascending and descending table in rear of the roughing-rolls is thus adapted to receive the piece $b$ from pass 1 and move it up to the level of and in line with pass 2.

Each shaft H' of the feed-rollers H carries at one end a bevel-wheel, $h^5$, meshing with a bevel-wheel, $h^6$, on a shaft, H⁹, mounted in suitable bearings on the frame H² of the table. Shaft H⁹ carries a fast spur-wheel, $h^7$, which is driven by a spur-wheel, $h^8$, fixed on a pin, $h^9$, which forms the pivot for connecting two links, $h^{10}$ and $h^{11}$, link $h^{10}$ being pivoted on shaft H⁹, and link $h^{11}$ being pivoted on a shaft, H¹⁰, which is mounted in suitable bearings, H¹¹, set at the side of the pit H¹³. A fast spur-wheel, $h^{12}$, on shaft H¹⁰ drives wheel $h^8$. Another fast spur-wheel, $h^{13}$, on shaft H¹⁰ is driven by a spur-wheel, $h^{14}$, on the longitudinal shaft H¹², the axis of which lies in a plane coincident with the plane of the axis of the crank-shaft E⁸ of the reversing-engine R E. Shaft H¹² extends to a point adjacent to the outer end of the crank-shaft E⁸, and carries a bevel-wheel, $h^{15}$, which meshes with a bevel-wheel, $h^{16}$, on the crank-shaft E⁸. (See Fig. 3.) Thus the feed-rollers H and I are driven by the same reversing-engine which drives the feed-rollers C and D, the driving-connection from shaft $H^{12}$ to the shaft $H^9$ being maintained in either position of the table by the train of spur-gearing before described.

Figure 7:
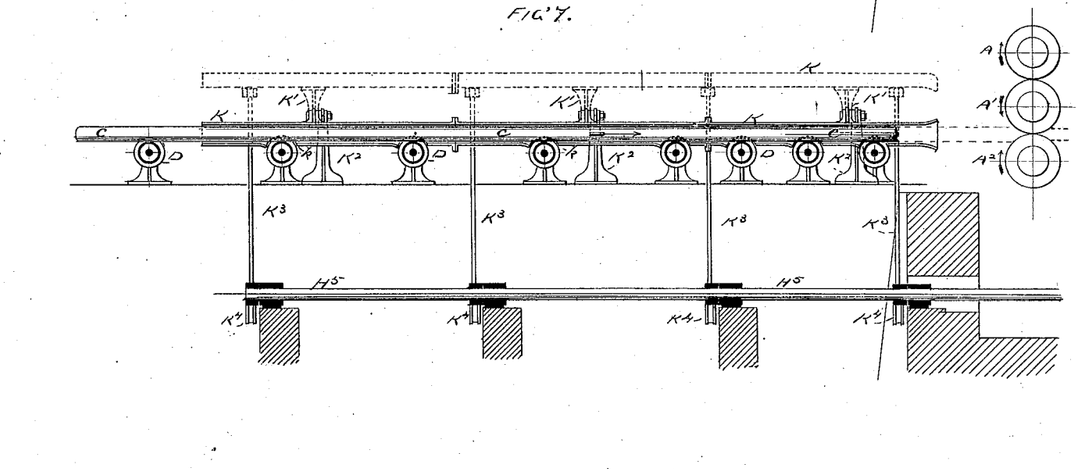
Fig. 7 is a longitudinal section of my power mechanism in front of the roughing-rolls, in planes indicated by lines 18 19 20 21 on Fig. 5.

As the piece $b$ emerges from pass $l$ of the roughing-rolls, it is received upon the feed-rollers H, then in the position they are shown in by full lines in Fig. 6. The rear roughing-table is then lifted to the position it is shown in by dotted lines in Fig. 6, engine R E is reversed, and the piece $b$ is fed into pass 2 of the roughing-rolls, emerging therefrom as piece $c$. (See Fig. 5.) Piece $c$ is received in a trough, K, which is supported on arms K', journaled in stands $K^2$. The trough K is also connected, at one side of the center of its supporting-arms, to the upper ends of connecting-rods $K^3$, the lower ends of which are pivoted to arms $K^4$ of the longitudinal rock-shaft $H^5$, heretofore described. After piece $c$ has wholly emerged from pass 2, the hydraulic pressure is removed from the plunger of hydraulic cylinder $H^7$, so that the trough K may turn from its elevated position down into its lowermost position, both the trough and the piece $c$ carried by it making a quarter-turn. The trough is so mounted that it stands a little to one side of a vertical line drawn through the axis of its supporting arms when it occupies its elevated position, so that its tendency is to turn down. This is not absolutely necessary, since it is connected to the same rock-shaft to which the rear roughing-table is connected, and the descent of the rear roughing-table, which occurs the moment the hydraulic pressure is removed from the plunger of hydraulic cylinder $H^7$, would therefore effect the turning of the trough, even though it stood, when elevated, vertically over the axis of its supporting-arms. In turning the trough down on its side it carries piece $c$ to and deposits it upon the feed-rollers D, the lower side of the trough being provided with openings $k$ opposite the feed-rollers D, (see Figs. 3 and 7,) to permit the trough to descend until its lower side is just below the upper surface of the feed-rollers D, so that the piece will then be wholly supported on said feed-rollers. The openings $k$ of the trough K are made flaring, so as to prevent the piece from catching on their edges as it is fed into the trough. The piece $c$ having been deposited on the feed-rollers D, engine R E is reversed, and the piece fed by the feed-rollers into pass 3 emerges therefrom at the rear side as piece $d$, (see Fig. 6,) which is received upon the feed-rollers I, which are made of suitable contour to hold the piece in proper position for the next pass. The table at the rear side of the roughing-rolls is immediately lifted, so as to carry the piece $d$ to a position in line with pass 4 of the roughing-rolls. Engine R E is again reversed and piece $d$ fed into pass 4, from which it emerges at the front side of the roughing-rolls as piece $e$, (see Fig. 5,) being received in a suitably-shaped trough, L. This trough is secured to the upper ends of arms L', fixed to a longitudinal rock-shaft, $L^2$, to which another arm, $L^3$, is also secured. Arm $L^3$ is pivoted at its outer end to the piston-rod of a double-acting hydraulic cylinder hung on trunnions, so that it may oscillate. Trough L occupies the position it is shown in by dotted lines in Fig. 5 while receiving piece $e$ from pass 4 of the roughing-rolls. As soon as the piece has wholly emerged from said pass, the piston of hydraulic cylinder $L^4$ is put in motion to turn the rock-shaft $L^2$ a quarter-turn, whereby the trough L is carried by its arms L' from the position it is shown in by dotted lines in Fig. 5 to the position it is shown in by full lines in said figure and Fig. 16, depositing the piece $e$, which receives a quarter-turn in the transfer, upon a line of feed-rollers, M. (See Figs. 3 and 16.)

Figure 5:
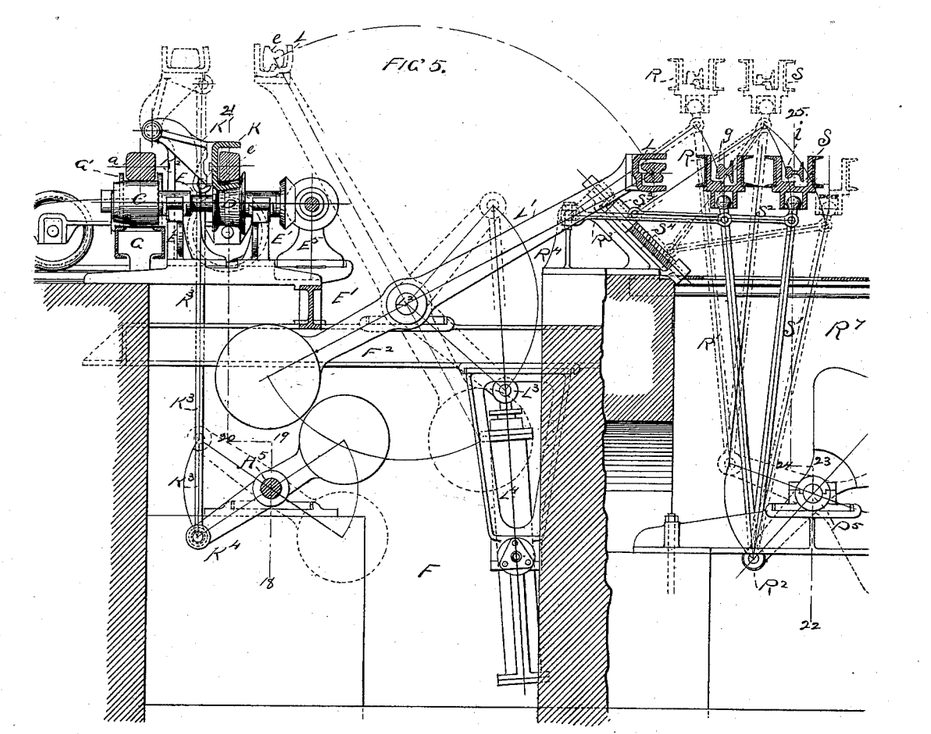
Fig. 5 is a transverse section, in planes indicated by lines 10 11 12 13 on Fig. 3, of my power mechanism in front of the rolls.
Figure 16:
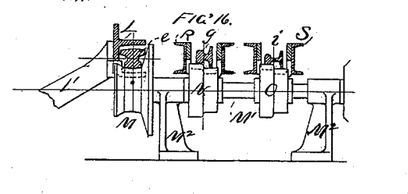
Fig. 16 is a transverse section on line 44 45 on Fig. 3.

The side of the trough which becomes the lower side when the trough occupies the position it is shown in by full lines in Fig. 5, is provided with trumpet-mouthed openings $l$ at points opposite the feed-rollers M, so that the trough may descend with its lower side below the level of the top of the feed-rollers M, as shown in Fig. 16, and leave the piece wholly supported on the latter. The feed-rollers M, which have a suitable contour for the proper support of the piece $e$, are arranged in line with the first pass—namely, pass 5—of the finishing-rolls. Each of the feed-rollers M is secured to a separate cross-shaft, M', mounted in suitable fixed bearings. These cross-shafts M' carry two additional lines of feed-rollers, (marked, respectively, N and O,) the feed-rollers N being arranged in line with pass 7 and the feed-rollers O in line with pass 9, some of the latter being adjustable, so that they may feed the piece either to pass 9 or to pass $9^a$, as may be required. Each shaft M', except one, which is coupled directly to the crank-shaft $M^4$ of a reversing-engine, R E', carries at one end a bevel-wheel, $m$, meshing with a bevel-wheel, $m'$, on one or the other of two longitudinal shafts, $M^3 M^3$, which are driven from the crank-shaft $M^4$ through the medium of bevel-wheels $m^2 m^3 m^3$, all as clearly shown in Fig. 3.

Piece $e$ is fed by feed-rollers M into pass 5 of the finishing-rolls, emerging at the rear side thereof as piece $f$. (See Figs. 6, 11, and 12.) It is received upon a line of rollers, P. A number of these rollers P adjacent to the finishing-rolls are mounted on a frame, P', hinged at its rear end to a stationary frame, $P^2$, on which the residue of rollers P is mounted. Frame P' is hinged to a horizontal cross-shaft, $P^3$, which is provided at its mid-length with a downwardly-projecting pin, $p$, journaled in a cross-bar of frame $P^2$, as clearly shown in Fig. 11. These parts constitute a universal joint for connecting the frame P' to the frame $P^2$.

Figures 9, 10, 11, 12, 13:
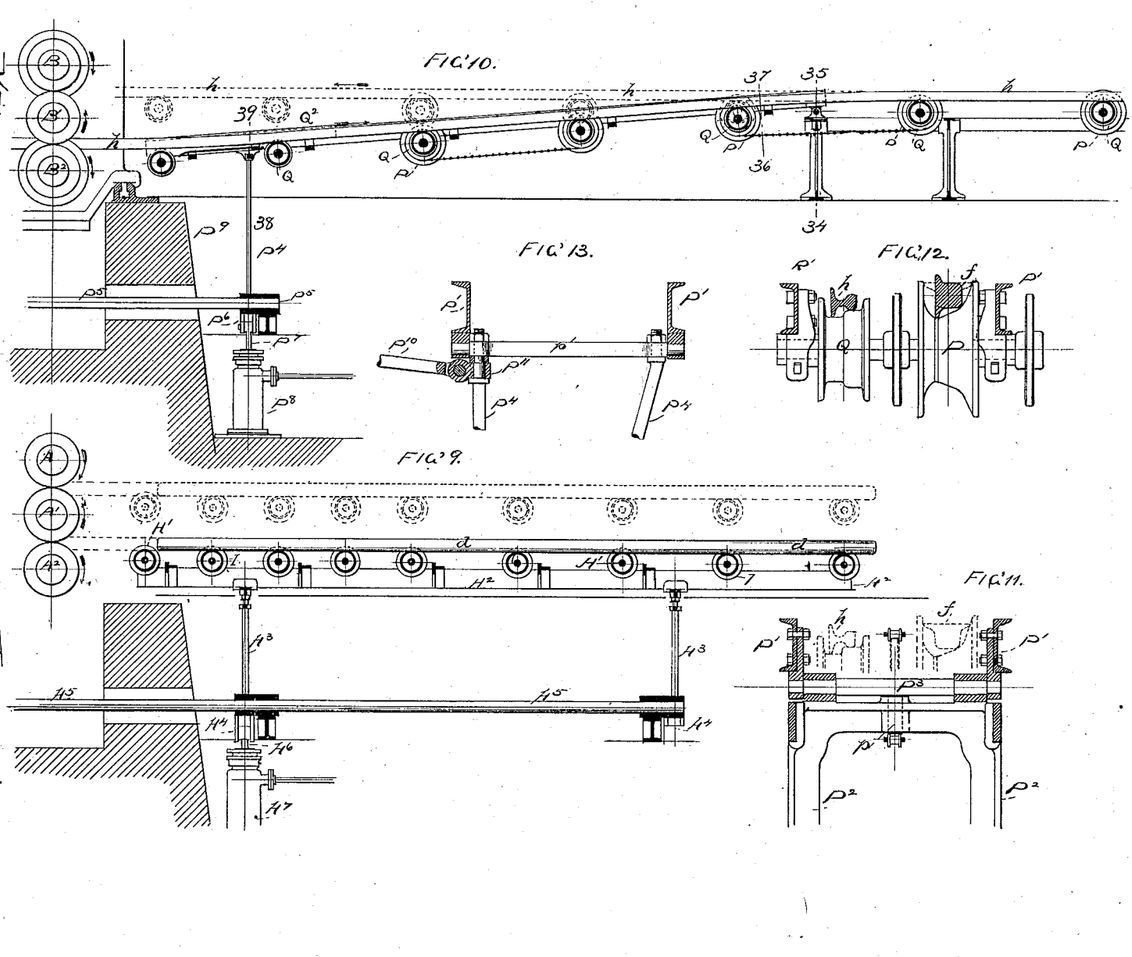
Fig. 9 is a longitudinal section of my power mechanism in rear of the roughing-rolls, in planes indicated by lines 26 27 28 29 on Fig. 6.
Fig. 10 is a longitudinal section of my power mechanism in rear of the finishing-rolls, in planes indicated by lines 30 31 32 33 on Fig. 6.
Fig. 11 is a transverse section on line 34 35 on Figs. 4 and 10.
Fig. 12 is a transverse section on line 36 37 on Figs. 4 and 10.
Fig. 13 is a transverse section on line 38 39 on Figs. 4 and 10.

The forward end of frame $P^2$ is supported over a pit, $P^9$, upon the plunger of a hydraulic cylinder, $P^8$, through the medium of the connecting-rod $P^7$, arm $P^6$ of rock-shaft $P^5$, and a pair of struts, $P^4 P^4$, as best shown in Fig. 6. The lower ends of the struts $P^4$ are joined in a suitable coupling-piece, which is connected by ball-and-socket joint with the arm $P^6$. The upper ends of the struts are secured to a cross-shaft, $p'$, journaled in the frame $P'$. (See Fig. 13.) The forward end of the frame $P'$ is also connected to a radius-link, $P^{10}$, through the intervention of a swiveling coupling, $P^{11}$, which in this instance is pivoted on one of the struts $P^4$, as shown in Fig. 13. The radius-link $P^{10}$ is pivoted to the upper end of a vertical pin, $P^{13}$, journaled in a stand, $P^{12}$, at the side of the frame $P'$. The feed-rollers P are secured to cross-shafts $Q'$, which carry a second line of feed-rollers, Q. (See Figs. 4, 6, 10, and 11.) The distance from center to center between these lines of feed-rollers is equal to the distance from center to center between the passes 5 and 7, or, what is the same, 6 and 8.

The frame $P'$, with its feed-rollers P and Q, constitutes a table which I term the "movable rear finishing-table," and the frame $P^2$, with its feed-rollers P and Q, constitutes a table which I term the "stationary rear finishing-table." The adjacent ends of the two tables are at the same level, and I prefer to arrange the stationary table at the level of the upper passes, as shown, so that in feeding the piece into the upper passes these tables will be in the same horizontal plane. By the time the piece emerges from pass 5 of the finishing-rolls it has attained such length as to be quite flexible. I take advantage of this fact and make only a part of the rear finishing-table movable, for the purpose of shifting the piece from pass to pass at one end only. The slight bending of the piece and the slightly-oblique position which the lines of feed-rollers in the movable rear finishing-table assume with reference to the lines of feed-rollers in the stationary rear finishing-table do not interfere appreciably with the proper feeding out and feeding in of the piece. The two rollers P next to the finishing-rolls are made cylindrical, so as to hold the piece, which in emerging from pass 5 bears down hard upon one or both of these cylindrical rollers by reason of the inclined position of the movable table, firmly in position, and thereby prevent the piece from being twisted in the residue of rollers P, which have the contour shown in Figs. 11 and 12. So long as a part of the piece remains in pass 5 of the finishing-rolls, and the downward pressure on the cylindrical feed-rollers P is maintained, the piece will be in the position it is shown in by full lines in Fig. 6 and by dotted in Fig. 11; but as soon as the piece is wholly discharged from pass 5 of the finishing-rolls, and its downward pressure on the cylindrical feed-rollers P suspended in consequence thereof, the piece $f$ is at liberty to make a quarter-turn and assume the position it is shown in by full lines in Fig. 12 and by dotted lines in Fig. 6. To effect the turning of the piece with certainty the feed-rollers P should be kept running for a moment after the discharge of the piece, and may be run back and forth if the piece should happen to stick. The piece will in every instance turn over on its side.

The cylindrical feed-rollers P are flanked by guide-plates $p^2 p^2$, for confining the piece and giving it proper direction.

The first shaft $Q'$ on the stationary rear finishing-table is driven from the crank-shaft $M^4$ of reversing-engine R E' through the intervention of the bevel-wheels $p^3 p^4$, shaft $p^5$, and bevel-wheels $p^6$ and $p^7$. A bevel-wheel, $p^8$, on the first shaft $Q'$ of the stationary rear finishing-table drives the bevel-wheel $p^9$ on a longitudinal shaft, $p^{10}$, which drives the other shafts $Q'$ on the stationary rear finishing-table by sets of bevel-wheels $p^{11} p^{12}$, only one set being shown. The shafts $Q'$ on the movable rear finishing-table are driven by chain gearing from the first shaft $Q'$ on the stationary rear finishing-table, as clearly shown in Fig. 4.

Figure 14:
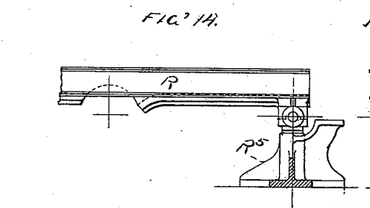
Fig. 14 is a longitudinal section on line 40 41 on Fig. 3.
Figure 15:
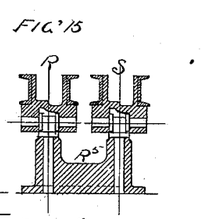
Fig. 15 is a transverse section on line 42 43 on Fig. 3.

The feed-rollers P having received the piece $f$ on emergence from pass 5, the plunger of hydraulic cylinder $P^8$ is put in operation to lift the rear finishing-table from the position it is shown in by full lines in Fig. 6 to the position it is shown in by dotted lines in said figure, whereby the piece, which in the meanwhile has made a quarter-turn, as before described, is transferred to the level of pass 6 of the finishing-rolls, with its adjacent end directly in line with said pass. Engine R E' is then reversed, so that the feed-rollers P will feed the piece $f$ into pass 6 of the finishing-rolls, from which it emerges at the front side as piece $g$ at the level on which it is shown by dotted lines in Fig. 5, being received in a trough, R. The end of the trough R adjacent to the finishing-rolls is connected by ball-and-socket joint to the upper end of the connecting-rod R', the lower end of which is pivoted to an arm, $R^2$, on the rock-shaft $P^5$, before described, and which extends from pit $P^9$ in rear of the finishing-rolls to the pit $R^7$ in front thereof. The connecting-rod R' is also connected near its junction with trough R with one end of a radius-link, $R^3$, the other end of which is connected by a universal joint to a fixed stand, $R^4$. The other end of the trough R is connected by a universal joint (see Figs. 14 and 15) to a stand, $R^5$, which is located at the adjacent end of a stationary longitudinal trough, $R^6$, which is arranged over some of the feed-rollers N, as shown in Fig. 3, the bottom of the trough $R^6$ being at a slightly lower level than the top of the feed-rollers, which project through trumpet-mouthed openings in the bottom thereof. The bottom of the movable trough R is provided with similar trumpet-mouthed openings, as shown in Fig. 14. The trough R I term the "first movable finishing-trough," and the trough $R^6$ I term the "first stationary finishing-trough." As soon as piece $g$ has been discharged from pass 6 of the finishing-rolls, the hydraulic pressure is removed from the plunger of hydraulic cylinder $P^8$, allowing the first movable finishing-trough to descend from the position it is shown in by dotted lines in Fig. 5 to the position it is shown in by full lines in said figure and Fig. 16, whereby the piece $g$ is transferred so as to carry its end adjacent to the finishing-rolls into line with pass 7 thereof, the movable trough sinking sufficiently to deposit the piece on the feed-rollers N underneath it. The movable rear finishing-table turns down at the same time. Engine R E' is then reversed, so that the feed-rollers N will feed the piece $g$ into pass 7. It emerges at the rear side of the finishing-rolls as piece $h$ at the level indicated by full lines in Fig. 6, and is received upon the feed-rollers Q, the first two thereof on the movable rear finishing-table being flanked by guide-plates $Q^2$, for giving proper direction to the piece. Immediately after the discharge of piece $h$ from pass 7 the plunger of hydraulic cylinder $P^3$ is again put in motion to elevate the movable rear finishing-table to the position it is shown in by dotted lines, Figs. 6 and 10, whereby the end of piece $h$ adjacent to the finishing-rolls is carried into line with pass 8 thereof. Engine R E' is then again reversed, so that the feed-rollers Q will feed piece $h$ into pass 8, from which it emerges at the front side of the finishing-rolls as piece $i$ at the level on which it is shown by dotted lines in Fig. 5. Piece $i$ is received in a trough, S, which I term the "second movable finishing-trough," and the end of which remote from the finishing-rolls is connected by a universal joint to the stand $R^5$, as best shown in Fig. 15.

The end of the trough S adjacent to the finishing-rolls is connected by ball-and-socket joint to the upper end of a connecting-rod, S', the lower end of which is pivoted to the arm $R^2$ of the same rock-shaft $P^5$ to which the movable rear finishing-table is connected, so that this second movable finishing-trough will move simultaneously with the movable rear finishing-table.

Figure 8:
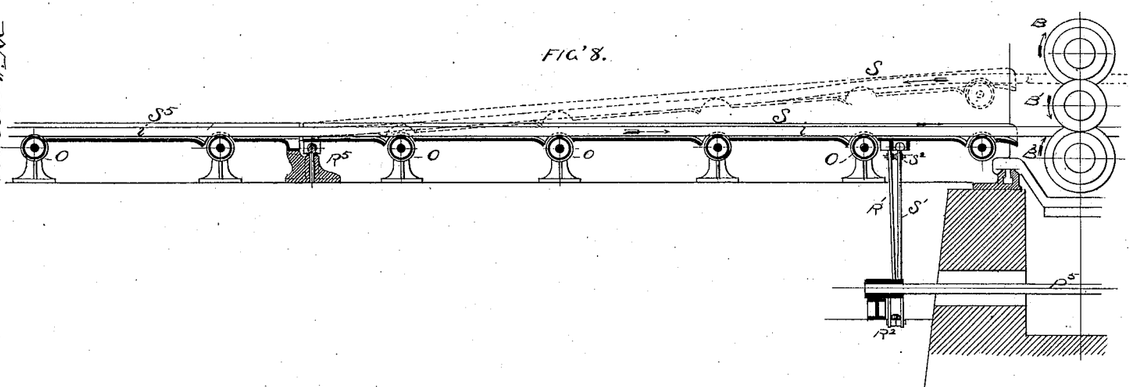
Fig. 8 is a longitudinal section of my power mechanism in front of the finishing-rolls, in planes indicated by lines 22 23 24 25 on Fig. 5.

Connecting-rod S' is connected near its junction with trough S to one end of a radius-link, $S^2$, the other end of which is pivoted to a nut, $S^3$, on a screw, $S^4$, which is journaled at its ends in bearings formed on the stand $R^4$. The screw $S^4$ is arranged at a suitable angle, so that in running the nut $S^3$ from the position it is shown in by full lines in Fig. 5 to the position it is shown in by dotted lines in said figure, (whereby the trough S is moved laterally so as to shift its end adjacent to the finishing-rolls from a point in line with pass 9 to a point in line with pass $9^a$,) the fulcrum of the radius-link $S^2$ is changed in such a way that the trough S will still reach, when elevated, approximately the same position which it reaches when the nut $S^3$ is in the position it is shown in by full lines. In other words, the trough S, when elevated, always reaches the same position, whether the nut $S^3$ is at the upper or lower end of the oblique screw $S^4$. This second movable finishing-trough is arranged over some of the line of feed-rollers O, a stationary trough, $S^5$, which I term the "second stationary finishing-trough," being arranged over the residue of feed-rollers O. The respective bottoms of troughs S and $S^5$ are provided with suitable trumpet-mouthed openings, as clearly shown in Fig. 8, through which the feed-rollers O may project, so as to support the piece above the bottom of the trough at the time when it is to be fed into finishing-pass 9 or $9^a$, as the case may be.

Piece $i$ having been discharged from pass 8 and delivered into troughs S and $S^5$, the hydraulic pressure is again removed from the plunger of hydraulic cylinder $P^3$, so as to permit the free end of trough S to turn down to the position it is shown in by full lines in Fig. 5, where it is in line with pass 9, having deposited the piece $i$ on the feed-rollers O beneath it. Engine R E' is then once more reversed, so that the feed-rollers O will feed piece $i$ into pass 9 of the finishing-rolls. From this pass it emerges in the form of a finished rail, $r$, being received in the tapering trough T, which guides it into the bite of the discharge-rollers U.

It is the common practice to construct the finishing-rolls with two finishing-passes exactly alike, as passes 9 and $9^a$, in order that after one has become worn the other may be used in place of it. To accommodate this condition, I make the second movable finishing-trough laterally adjustable in the manner before described. I also provide for a corresponding lateral adjustment of those feed-rollers O which are under said movable trough. This adjustment of said feed-rollers is effected by shifting them on their shafts. The end of the tapering trough T adjacent to the finishing-rolls is made wide enough to receive the rail from either finishing-pass 9 or $9^a$.

The rock-shafts $H^5$, $L^5$, and $P^5$ are provided with suitable counter-weights, as shown, in order to counterbalance the movable troughs and tables connected with them.

The consecutive lines of feed-rollers and troughs increase in length proportionately with the increase in length of the piece by the action of the successive passes.

The movable troughs may be provided with anti-friction rollers, as indicated by dotted lines in connection with trough L in Fig. 3. All the movable troughs are mere carriers to transfer the piece from an upper pass and deposit it in the required position upon a stationary line of feed-rollers in front of a lower pass, and these carriers need not necessarily be of trough form, though that is a convenient and practical form.

While I prefer to space all the passes in a set of rolls equally, as described, it is really necessary only to make the space between the first two passes equal to the space between the next two, and so on. For instance, the space between passes 3 and 4 of the roughing-rolls must be equal to the space between passes 1 and 2 thereof; but passes 2 and 3 may be spaced indifferently without regard to the spacing of the other passes. Hence where three-high rolls having equally-spaced passes are mentioned in the claims, I refer to rolls the passes of which are equally spaced in sets, as just explained. This equal spacing of the passes might be dispensed with by making all the lines of feed rollers and carriers independent, which would, however, complicate the mechanism somewhat, so that it is preferable to use equally-spaced rolls. They enable me to operate the carriers on opposite sides of the rolls through a single longitudinal rock-shaft.

It is obvious that the oblique movements of the movable tables and of some of the troughs might be effected by oblique guides instead of by radius-links. An obliquely ascending and descending feed-table might be used in front of the roughing-rolls in lieu of the stationary lines of feed-rollers and carrier or trough K, suitable other means being provided for turning the piece c.

In three-high rolls, where a pass (one or more) between the middle and upper rolls is vertically over a pass between the middle and lower rolls, a vertically-moving carrier or feed-table, as the case might be, would be used on one side of the rolls to transfer the piece vertically, and an obliquely-moving carrier or feed-table on the other side of the rolls to effect the transfer of the piece between alternating upper and lower passes.

I am aware that heretofore vertically-moving feed-tables on opposite sides of three-high rolls have been simultaneously operated through the intervention of transverse rock-shafts and bell-cranks. The use of such transverse rock-shafts made the mechanism for moving the tables quite complicated, with many movable joints liable to wear. By the use of a single longitudinal rock-shaft, I simplify the mechanism very materially, and such longitudinal rock-shaft may be used with the same advantages whether the feeding and transferring devices on opposite sides of the rolls move vertically or obliquely or swing, and my invention includes all of these combinations.

It is obvious that steam cylinders or engines may be used in lieu of the hydraulic cylinders described.

The details of construction and arrangement may be greatly varied, to suit circumstances or the views of users, without departing from the principle of my invention.

I claim as my invention—

1. The combination, substantially as before set forth, of a set of three-high rolls constructed with equally-spaced passes, stationary lines of feed-rollers and a movable carrier in front of said rolls, a movable feed-table in rear of said rolls, and the mechanism, substantially such as described, for simultaneously moving said carrier and feed-table back and forth to register alternately with successive upper and lower passes.

2. The combination, substantially as before set forth, of a set of three-high rolls, a stationary line of feed-rollers in line with a lower pass thereof, a movable carrier, and the mechanism, substantially such as described, for transversely moving the carrier from a preceding upper pass to a point where the supporting-surface of the carrier is in line with and below the top of the said feed-rollers.

3. The combination, substantially as before set forth, of a set of three-high rolls, a movable carrier, and the mechanism, substantially such as described, for elevating and lowering the carrier through an oblique path to register alternately with an upper and a lower pass.

4. The combination, substantially as before set forth, of a set of three-high rolls, a movable feed-table, and the mechanism, substantially such as described, for elevating and lowering the feed-table through an oblique path.

5. The combination, substantially as before set forth, of a set of three-high rolls, a movable carrier, (or feed-table,) the mechanism, substantially such as described, for elevating and lowering the carrier, and a radius-link fulcrumed at one end, and pivoted to the carrier with its other end.

6. The combination, substantially as before set forth, of a set of three-high rolls, a movable carrier (or feed-table) on one side thereof, a movable feed-table on the other side thereof, a single longitudinal rock-shaft, and the means, substantially such as described, for connecting both the carrier and the feed-table with the rock-shaft, by the rocking of which the said carrier and feed-table on opposite sides of the rolls are simultaneously moved.

7. The combination, substantially as before set forth, of the first line of feed-rollers in front of the roughing-rolls, and the bloom-carriage arranged in a track at right angles to said line of feed-rollers, and constructed with a transverse bloom-supporting surface, substantially such as described, whereby the bloom may be delivered laterally from the carriage to the feed-rollers.

8. The combination, substantially as before set forth, of the three-high roughing-rolls, the second line of feed-rollers in front thereof, the pivoted trough provided with openings in one side to admit the feed-rollers, and the mechanism, substantially such as described, for transferring and turning the trough from a point in front of pass 2 to a point where its side having openings is below the top of said feed-rollers.

9. The combination, substantially as before set forth, of the line of feed-rollers in front of pass 5 of the finishing-rolls, the pivoted trough (for receiving the piece from pass 4 of the roughing-rolls) having openings in its side to admit the feed-rollers, and the mechanism, substantially such as described, for transferring and turning the trough down to a point where its side having openings is below the top of said feed-rollers.

10. The combination, substantially as before set forth, of the trough for transferring the piece from the last pass of the roughing-rolls to the first pass of the finishing-rolls, the lever to which the trough is secured, and trunnioned double-acting hydraulic cylinder for swinging said lever and trough.

11. The combination, substantially as before set forth, of a set of three-high rolls, a movable table, (or trough,) and a stationary table, (or trough,) forming a continuation of the movable one, the movable one being pivoted by a universal joint at the adjacent end of the stationary one, so as to be movable in an oblique direction.

12. The combination, substantially as before set forth, of the second line of feed-rollers in front of the finishing-rolls, the first movable trough, said trough being pivoted at its end remote from the rolls, and having openings in its bottom to admit the feed-rollers, and the mechanism, substantially such as described, for lowering the trough from its turned-up position to a point where its supporting-bottom is below the top of the feed-rollers.

13. The combination, substantially as before set forth, of a set of three-high rolls having two finishing-passes, 9 and $9^a$, the second movable trough in front thereof, and laterally adjustable, as described, so that it may register with either of said passes 9 or $9^a$, and the mechanism, substantially such as described, for moving the trough to transfer the piece from a preceding pass.

14. The combination, substantially as before set forth, of the second movable trough in front of the finishing-rolls, the radius-link connected thereto, the adjustable fulcrum of said radius-link, and the obliquely-arranged screw for adjusting said fulcrum.

15. A plant for rolling rails, consisting of three-high rolls and the trains of mechanism, substantially such as described, for feeding, transferring, and turning the piece, whereby a bloom may be converted into a rail wholly automatically.

16. The combination, substantially as before set forth, of a stationary line of feed-rollers, a movable continuous trough provided with openings to admit the feed-rollers through its supporting-surface, and the mechanism, substantially such as described, for lowering such trough from an elevated position to a point where its supporting-surface is below the top of the feed-rollers.

In testimony whereof I affix my signature in presence of two witnesses.

FRANCIS H. TREAT.

Witnesses:
C. A. NEAL,
E. T. WALKER.